United States Patent [19]

Mori

[11] Patent Number: 4,694,796

[45] Date of Patent: Sep. 22, 1987

[54] SYSTEM AND METHOD FOR CONTROLLING FUEL SUPPLY TO A VEHICULAR INTERNAL COMBUSTION ENGINE WITH FUEL SUPPLY CUTOFF FUNCTION

[75] Inventor: Yasushi Mori, Yokohama, Japan

[73] Assignee: Nissan Motor Company, Limited, Yokohama, Japan

[21] Appl. No.: 861,008

[22] Filed: May 8, 1986

[30] Foreign Application Priority Data

May 10, 1985 [JP] Japan .................................. 60-99268

[51] Int. Cl.$^4$ ............................................ F02D 41/12
[52] U.S. Cl. ...................................... 123/325; 123/493
[58] Field of Search ........................ 123/325, 326, 493

[56] References Cited

U.S. PATENT DOCUMENTS

| 4,285,314 | 8/1981 | Kiencke et al. | 123/325 |
| 4,416,230 | 11/1983 | Katayose et al. | 123/325 |
| 4,434,759 | 3/1984 | Iezuka et al. | 123/325 |
| 4,572,126 | 2/1986 | Arnold et al. | 123/325 |
| 4,599,695 | 7/1986 | Deutsch | 123/325 |

Primary Examiner—William A. Cuchlinski, Jr.
Attorney, Agent, or Firm—Schwartz, Jeffery, Schwaab, Mack, Blumenthal & Evans

[57] ABSTRACT

A system and method for controlling a fuel supply to a vehicular internal combustion engine, in which a predetermined threshold value at which a fuel supply cutoff zone of the engine is initiated is varied so as to provide an optimum range of the fuel cutoff zone according to a magnitude of the engine deceleration and the variation of the predetermined threshold value is learned and stored for the subsequent use as the predetermined threshold value to cope with a characteristic change of the system including the engine and engine output power transmission. When the magnitude of the engine deceleration is large, the predetermined threshold value is increased so as to avoid repetition of fuel supply cutoff and fuel supply resumption which affects adversely the engine driveability. When the magnitude is small, the predetermined threshold value is decreased i.e., made closer to another predetermined threshold value at which a fuel supply recovery is carried out so as to extend the fuel supply cutoff zone.

19 Claims, 10 Drawing Figures

ENGINE SPEED (Ne) / PUMP ROTATION SPEED (Np) — vertical axis (LARGE upward, Nr at bottom)
TURBIN ROTATION SPEED (Nt) — horizontal axis (LARGE to the right)

| | | | | | | | | | | | | |
|---|---|---|---|---|---|---|---|---|---|---|---|---|
| 1 | 1 | O | O | O | O | O | O | O | O | O | O | O |
| 1 | 1 | O | O | O | O | O | O | O | O | O | O | O |
| 1 | 1 | O | O | O | O | O | O | O | O | O | O | O |
| 1 | 1 | O | O | O | O | O | O | O | O | O | O | O |
| 1 | 1 | O | O | O | O | O | O | O | O | O | O | O |
| 1 | 1 | O | O | O | O | O | O | O | O | O | 1 | 1 |
| 1 | 1 | O | O | O | O | O | O | O | 1 | 1 | 1 | 1 |
| 1 | 1 | O | O | O | O | O | O | 1 | 1 | 1 | 1 | 1 |
| 1 | 1 | O | O | O | O | O | 1 | 1 | 1 | 1 | 1 | 1 |
| 1 | 1 | O | O | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 |

FIG. 6

FUEL SUPPLY CUTOFF ENABLE ENGINE SPEED

| (Nec) | 1000 | 1000 | 1200 | 1400 | 1600 | 1800 | 2000 | 2500 | 3000 | 4000 |
|---|---|---|---|---|---|---|---|---|---|---|

TURBIN ROTATION SPEED (Nt) ⟶ LARGE

SYSTEM AND METHOD FOR CONTROLLING FUEL SUPPLY TO A VEHICULAR INTERNAL COMBUSTION ENGINE WITH FUEL SUPPLY CUTOFF FUNCTION

BACKGROUND OF THE INVENTION

The present invention relates to a system and method for controlling supply of fuel to a vehicular internal combustion engine which cuts off the supply of fuel when a predetermined condition is satisfied. The present invention is particularly applicable to vehicles having automataic transmissions.

A main object to carry out cutoff of fuel supply to the vehicular engine is to reduce remarkably fuel consumption and unnecessary exhaust gas. In addition, it is necessary to achieve these items to be reduced efficiently without sacrifice of driveability of the engine.

One of conventional systems described above is exemplified by a U.S. Pat. No. 4,395,984 filed on Sept. 25, 1980 and issued on Aug. 2, 1983.

In the above-identified Patent document, the fuel supply cutoff and resumption are carried out with a throttle valve in a throttle chamber fully closed during deceleration of the vehicle in accordance with a change in an engine speed directly detected by means of a crankshaft rotation speed (crank angle) sensor in order to achieve the above-described main object.

However, the above-described fuel supply control system has a drawback. That is to say, since in a vehicular engine linked with a non-rigid power transmission mechanism constituted by a fluid coupling or torque converter, a conversion rate of torque versus revolution number (engine speed) is different dependent upon a gear position of the non-rigid power transmission mechanism. Therefore, a difference exists between an optimum engine speed at which the fuel supply is resumed after the fuel supply cutoff and the actual engine speed at which the fuel supply is resumed.

As described above, since the conventional system determines to cut off the fuel supply mainly on the basis of the engine speed, the following problems occur.

(I) When a load applied to the engine is large, for example, in a case where such an auxiliary equipment as an air conditioner is operated and therefore a drop in the engine speed is fast, the engine speed decreases even though the fuel supply cutoff is initiated from the engine speed slightly higher than the fuel supply cutoff speed limit and immediately reaches a fuel supply recovery enable speed limit. In this case, the fuel supply cutoff and recovery are carried out in a very short time so that the engine driveability is reduced. (Refer to (C) in FIG. 7)

(II) When the engine is driven from the vehicle via the torque converter, for example, in a case where vehicle travels along a long down hill, the fuel supply cutoff is not carried out even though the engine speed is in the fuel supply cutoff zone since the engine is decelerated from an engine speed below the fuel supply cutoff speed limit $N_c$. (Refer to (b) of FIG. 7)

(III) Furthermore, since the fuel supply cutoff enable speed limit $N_c$ is fixed, e.g., according to an engine cooling water temperature, it is set to a value slightly higher than an ideal fuel supply cutoff enable speed limit to cope with a characteristic change in each part of the system including the engine and automatic transmission. In this way, in the conventional fuel supply control system, the fuel supply cutoff and resumption are not carried out so as to completely match with the engine operating condition.

The same Applicant has filed a U.S. patent application Ser. No. 719,018 filed on Apr. 2, 1985 (now pending) which discloses the fuel supply system and method to the vehicular internal combustion engine which the above-described drawbacks considerably eliminates and increases the effect of fuel supply cutoff, i.e., saving of fuel consumption.

The Applicant has found that the fuel supply system and method disclosed in the above-identified U.S. Patent Application is still insufficient in that the function of fuel supply cutoff can ideally be enhanced with an appropriate determination of dispersions in characteristics and aging effect of parts in each portion of the fuel supply control system, engine, and power transmission mechanism (hereinafter, these changes are simply referred to as characteristic change).

SUMMARY OF THE INVENTION

With the above-described problem in mind, it is a main object to provide a system and method for controlling fuel supply to a vehicular engine which enhances more remarkably an effect that the fuel supply cutoff naturally has without sacrifice of engine driveability.

It is another object of the present invention to provide a system and method for controlling fuel supply to a vehicular engine which carries out appropriately control over a fuel supply cutoff irrespective of how a characteristic change of each part of the system occurs.

It is still another object of the present invention to provide a system and method for controlling the fuel supply to the vehicular engine in which a concept of learning control is introduced to carry out the control over the fuel supply cutoff.

These objects can be achieved by providing a system for controlling fuel supply to a vehicular engine, comprising: (a) first means for detecting whether the engine has entered a predetermined deceleration state; (b) second means for measuring a magnitude of the engine deceleration when the engine has entered the predetermined deceleration state; (c) third means for varying a first predetermined threshold value defining a cutoff zone of fuel supplied to the engine and at which the cutoff of fuel supply to the engine is initiated so as to provide an optimum range of the cutoff zone according to the measured magnitude of engine deceleration; and (d) fourth means for learning the variation of the first predetermined threshold value and storing the first predetermined threshold value varied in the third means, the learned and stored first predetermined threshold value thereby being used as the first predetermined threshold value in the third means.

BRIEF DESCRIPTION OF THE DRAWINGS

A more complete understanding of the present invention may be obtained from the following detailed description taken in conjunction with the attached drawings in which like reference numerals designate corresponding elements and, in which.

DETAILED DESCRIPTION OF THE PREFERRED EMBODIMENTS

Reference will be made to the drawings in order to facilitate understanding of the present invention.

Figure 1:
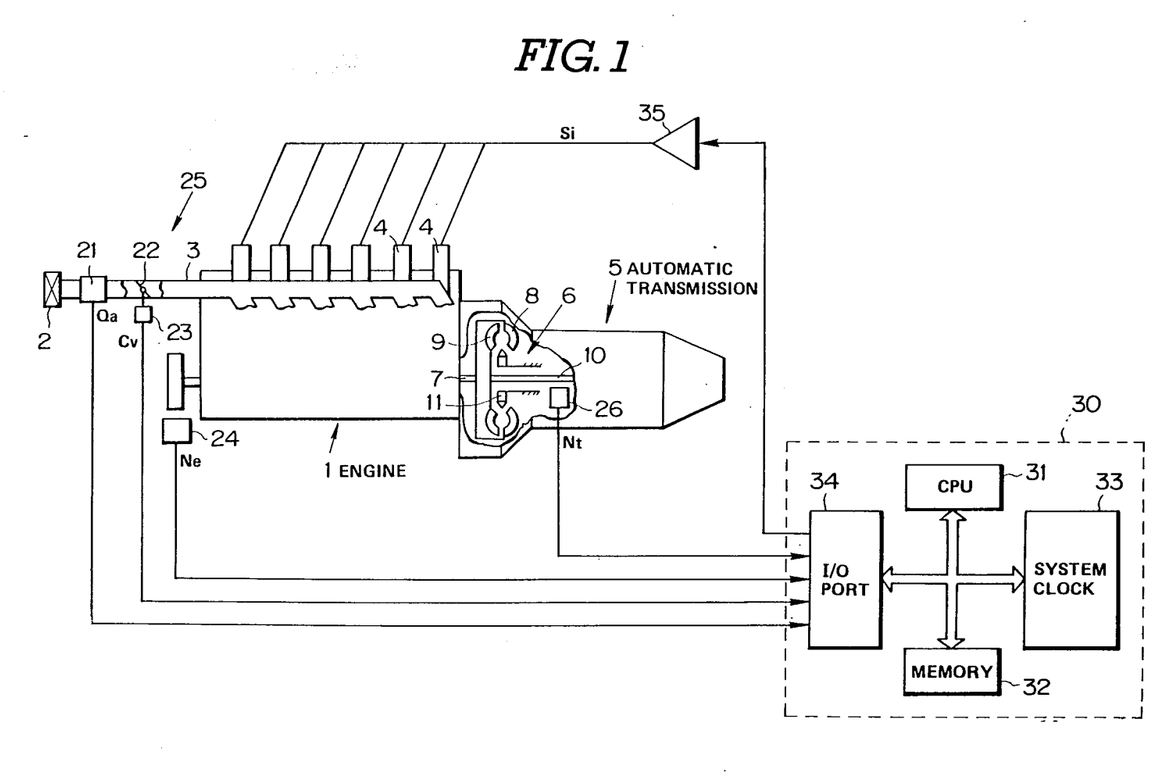
FIG. 1 is an overall circuit block diagram of a first preferred embodiment according to the present invention.
Figure 2A:
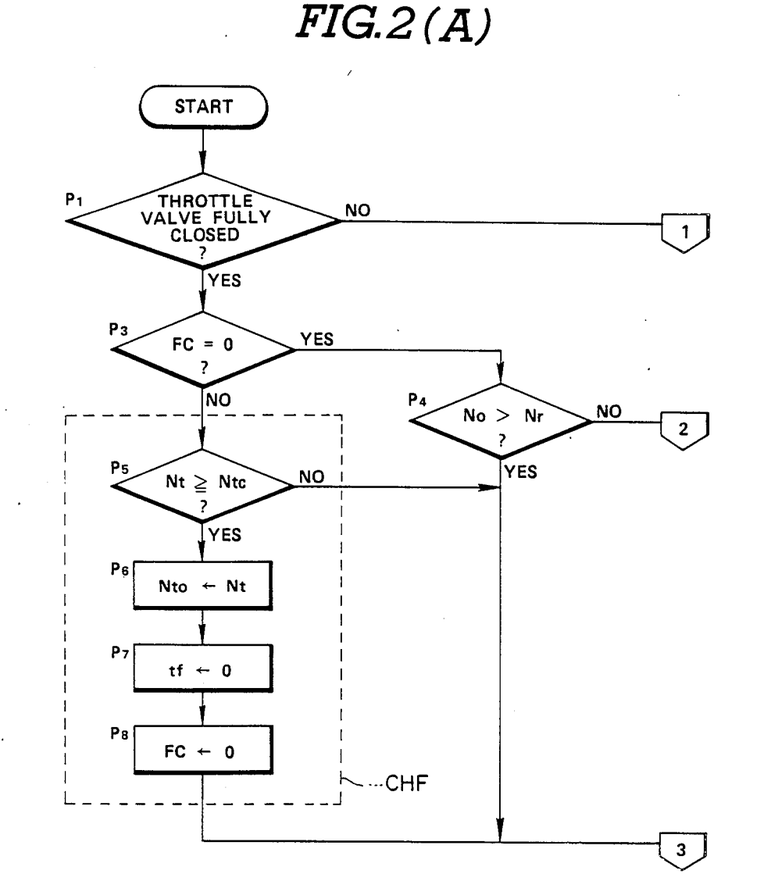
FIGS. 2(A) and 2(B) are integrally a processing flowchart for an execution of fuel supply cutoff control in the system shown in FIG. 1.
Figure 2B:
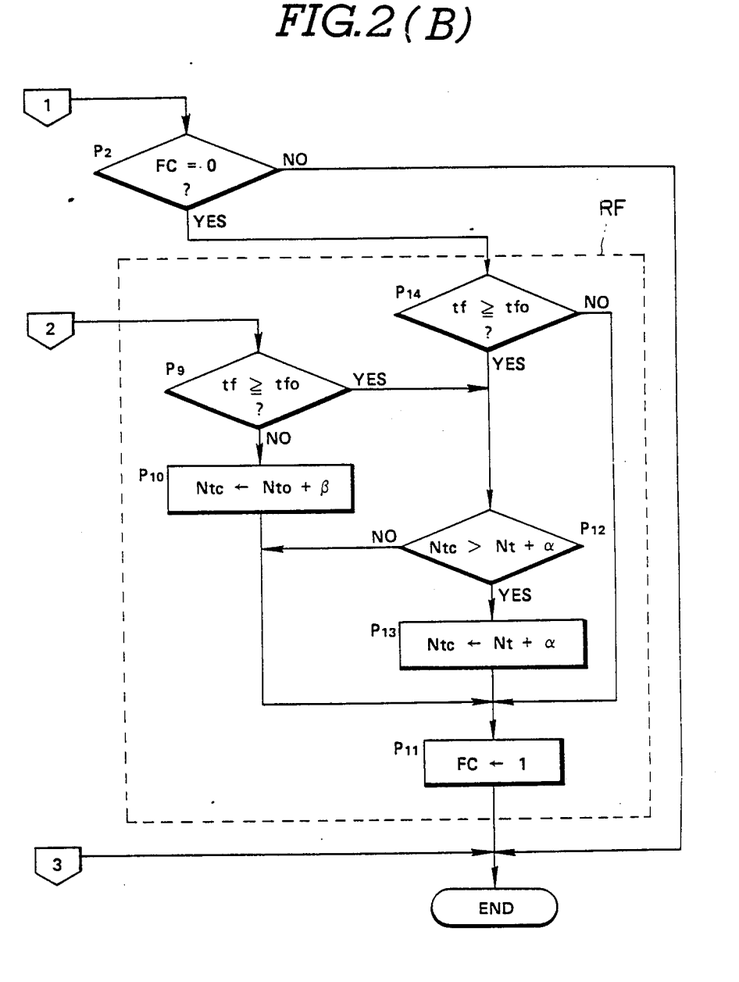

FIGS. 1 through 2(B) show an overall circuit configuration of a vehicular engine fuel supply control system and processing flowcharts of a first preferred embodiment.

In FIG. 1, an internal combustion engine 1, e.g., having six cylinders has an air cleaner 2 through which intake air is introduced to an intake air pipe 3. The intake air is further distributed to each cylinder. On the other hand, fuel is injected into each intake manifold attached to the cylinders through each fuel injector 4 for a time duration and at a start time determined by means of an injection signal $S_i$. Air-fuel mixture supplied within each cylinder is burned and exploded at a predetermined timing and exhausted as exhaust gas via an exhaust pipe (not shown) to the air.

An explosion force generated when air-fuel mixture in each cylinder is burnt is transmitted as an engine output power to the vehicle wheels via an automatic transmission in any given gear position (power transmission mechanism) 5 so that the vehicle can travel upon receipt of the engine output power. The automatic transmission 5 has a torque converter 6, the torque converter 6 transmitting a rotation torque of a pump impeller 8 integrally rotated with an input axle 7 (original moving axle) linked to the engine 1, i.e., crankshaft (not shown) to a turbine runner 9 via a predetermined operating fluid (preferably oil) so that the engine output power is transmitted to an output axle 10 (moved axle) integrally rotated with the turbine runner 9. The rotation torque of the output axle 10 is finally transmitted to drive wheels of the vehicle via a planetary gear unit constituting an auxiliary transmission to act as a vehicle traveling force.

In FIG. 1, numeral 11 denotes a stator. It should be noted that while the engine 1 is in the fuel supply cutoff state, the automatic transmission 5 transmits a running inertia force of the vehicle to the engine to drive the engine 1 with a negative-directional torque.

The quantity of intake air $Q_a$ to the engine 1 is detected by means of an airflow meter 21 located within the intake air pipe 3 and is controlled according to an opening angle of a throttle valve 22 located within a throttle chamber of the intake air pipe 3. The throttle valve 22 is linked with an accelerator pedal (not shown). The opening angle $C_V$ of the throttle valve 22 is detected by means of a throttle valve opening angle sensor 23. The engine speed $N_e$ of the engine 1 is detected by means of a crank angle sensor 24. The above-described airflow meter 21, throttle valve opening angle sensor 23, and crank angle sensor 24 constitute engine driving condition detecting means 25.

A turbine speed $N_t$ of the torque converter 6 is detected by means of a turbine speed sensor 26 (inertia state detecting means). Each output signal of the engine driving condition detecting means 25 and turbine speed sensor 26 is sent to a control unit 30. The control unit 30 carries out the fuel supply control on the basis of such sensed information from these detecting means. The control unit 30 usually comprises a microcomputer having a Central Processing Unit (CPU) 31, memory 32, System clock 33, and Input/Output Port 34 (I/O Port).

The CPU 31 receives required external data from the I/O port 34 in accordance with a program assembled in the memory 32, calculates and processes various data transferring the data to and from the memory 32, and outputs the processed data to the I/O port 34. The I/O port 34 receives the output signals of the engine driving condition detecting means 25 and turbine rotation speed sensor 26 and outputs the injection signal $S_i$. The injection signal $S_i$ is sent to each fuel injector 4 via an amplifier 35. The fuel injection timing and duration, e.g., per cylinder is determined by a level change timing and pulsewidth of the injection signal. The pressure of fuel in each fuel injector 4 is set at a constant value or variable according to the engine operating condition. The detailed description of the contents of the injection signal $S_i$ is omitted here. The memory 32 specifically constituted by a RAM (Random-Access Memory) and by a ROM (Read Only Memory) stores the calculation processing program and intermediate data used for such calculation processing. The System Clock 33 generates reference clocks required for calculation of processing timings.

(Operation)

FIGS. 2(A) and 2(B) are integrally a flowchart indicating a processing routine of the fuel supply cutoff in the first preferred embodiment.

The processing routine shown in FIGS. 2(A) and 2(B) is executed once for each predetermined period of time.

In a first step P1, the control unit 30 checks to see if the throttle valve 22 is fully closed or not. If the throttle valve 22 is not fully closed, the routine goes to a step P2. If the throttle valve 22 is fully closed, the routine goes to a step P3. In these steps P2 and P3, a bit status of a fuel flag FC is similarly checked. The fuel flag FC indicates whether the supply of fuel has been cut off or continued. When the flag FC is set (FC=1), the fuel supply has been continued. When the flag FC is reset (FC=0), the fuel supply has been cut off.

In the step P2 upon determination that the throttle valve is not fully closed, if the status of flag FC is 1(FC=1), the present processing routine has ended since the current engine operating state is in the fuel supply condition. When FC=0 in the step P2, the control unit 30 determines that an acceleration operation has been carried out (the throttle valve 22 has been opened from the fully closed state) at the present time although the engine 1 was previously in the fuel supply cutoff state and the routine goes to a recovery processing block RF to be described later.

In the step P3 upon determination that the throttle valve is fully closed, the control unit 30 checks to see if the status of flag FC is set (FC=1) or reset. If FC=1, the routine goes to a fuel supply cutoff processing block CHF. If FC=0, the routine goes to a step P4 to determine whether the engine speed $N_e$ detected by means of the crank angle sensor 24 decreases below a recovery engine speed limit $N_r$ (a set engine speed value at which the supply of fuel is resumed) since the control unit 30 has determined that the engine 1 is already in the fuel supply cutoff state. If $N_e > N_r$, the control unit 30 determines that the engine speed $N_e$ does not yet decrease and reach the recovery engine speed $N_r$ and the present routine is ended. Then the engine is still maintained in the fuel supply cutoff state.

On the other hand, if $N_e \leq N_r$ in the step P4, the routine goes to the fuel supply recovery processing block RF since the engine is under the condition to carry out the recovery of fuel supply RF.

The fuel supply cutoff processing block CHF will be described below.

In a step P5, the control unit 30 compares the current turbine rotation speed $N_t$ with a fuel supply cutoff enable turbine rotation speed $N_{tc}$. The fuel supply cutoff enable turbine rotation speed $N_{tc}$ is a rotation speed of the turbine runner 9. It is noted that this fuel supply cutoff enable turbin rotation speed $N_{tc}$ is a rotation speed limit to determine whether the fuel supply cutoff should be carried out during deceleration and corrected to an optimum value with the fuel consumption taken into full consideration through a learning control method to be described later. If $N_t < N_{tc}$ in the step P5, the present routine is ended since the control unit 30 determines that it is not the condition to carry out the fuel supply cutoff. If $N_t \geq N_{tc}$ in the step P5, the control unit 30 determines that the engine is under the fuel supply cutoff condition and the routine goes to a step P6. In the step P6, the control unit 30 stores the instantaneous turbine rotation speed $N_t$ as a fuel supply cutoff start rotation speed $N_{to}$.

In the next step P7, a cutoff timer $t_f$ is cleared ($t_f = 0$) and reinitiated. The cutoff timer $t_f$ is used to measure a duration of time for which the fuel supply cutoff is continued. In the next step P8, the flag FC is reset (FC=0). The control unit 30 at this time multiplies a quantity of fuel supply to the engine $T_p$ which has been calculated in another program routine in accordance with the following equation (1) by FC=0 so that the quantity $T_p$ gives zero. Consequently, the engine 1 is entered in the fuel supply cutoff state.

$$T_p = K \cdot Q_a / N \qquad (1)$$

In the equation (1), K denotes a constant number and N denotes the engine speed.

Therefore, the fuel supply cutoff is carried out and during the fuel supply cutoff state the routine is repeated in a loop formed with the steps P1, P3, and P4.

When the engine 1 is in the fuel supply cutoff condition, (I) the engine speed N is reduced and reaches the recovery rotation speed limit $N_r$ or (II) the routine goes to the fuel recovery processing block RF upon an acceleration operation and the fuel supply recovery is carried out after a predetermined learning is carried out.

(I) A case when the routine is transferred to the fuel recovery processing block RF from the step P4 ($N_e \leq N_r$):

In a step P9, the control unit 30 compares the measured value $t_f$ of the cutoff timer $t_f$ with a predetermined value $t_{fo}$. If $t_f < t_{fo}$, the routine goes to a step P10 in which the current fuel supply cutoff enable rotation speed limit $N_{tc}$ is increased by a positive predetermined value $\beta$ ($N_{tc} + \beta$) since the control unit 30 determines that the condition satisfying the inequality of $N_e \leq N_r$ has been established even though a scheduled fuel supply cutoff duration is not yet sufficiently elasped. The routine then goes to a step P11. Consequently, the fuel supply enable turbine rotation speed limit $N_{tc}$ is increased by the predetermined value $\beta$ at the time of the next processing routine so that the timing at which the fuel supply cutoff is started becomes earlier and the fuel supply cutoff such that its duration is too extremely short to affect adversely the engine driveability is thereby inhibited.

In the step P11, the fuel supply flag FC is newly set (FC=1) and the calculated quantity of fuel $T_p$ is multiplied by one (FC=1) which corresponds to the status of flag FC. Hence, each fuel injector 4 injects fuel whose quantity corresponds to the value of $T_p$ to resume fuel supply.

On the other hand, if $t_f \geq t_{fo}$ in the step P9, the control unit 30 determines that the condition of $N_e \leq N_r$ is returned after the lapse of the scheduled fuel cutoff duration and the routine goes to a step P12 wherein the instantaneous fuel supply cutoff enable rotation speed limit $N_{tc}$ is compared with the instantaneous turbine rotation speed $N_t$ to which a positive predetermined value $\alpha$ is added ($N_t + \alpha$). If $N_{tc} > N_t + \alpha$ in the step P12, the value of $N_{tc}$ is replaced with the value of ($N_{tc} + \alpha$) (provided that the value of $\alpha$ is a positive predetermined value) in step P13 to correct the turbine rotation speed limit $N_{tc}$ so as to reduce the turbine rotation speed limit $N_{tc}$ since the control unit 30 determines that a sufficient fuel supply cutoff has been provided even though the magnitude of deceleration of the vehicle is large. Then, in the step P11, the fuel supply recovery is carried out. It is noted that the large magnitude of the deceleration of the vehicle causes the faster reduction of the engine speed $N_e$ and the duration of the fuel supply cutoff becomes shorter even though the fuel supply cutoff start state ($N_e$, $N_t$) is the same. On the other hand, if $N_{tc} \leq N_t + \alpha$ in the step P12, the routine goes directly to the step P11 since the control unit determines that the magnitude of the deceleration of the vehicle is small.

(II) A case when the acceleration operation is carried out:

The routine goes to the step P14 from the step P2. In the step P14, the same process as in the step P9 is carried out. At this time, if $t_f < t_{fo}$, the routine goes to the step P14 in which the calculated fuel quantity $T_p$ is multiplied by one (FC=1) to restart the fuel supply to the engine. If $t_f \geq t_{fo}$ in the step P14, the routine goes to the step P12. At this time, since the current turbine rotation speed $N_t$ usually exceeds the fuel cutoff enable turbine rotation speed limit $N_{tc}$, the routine goes to the step P11 without correction of the value of the fuel supply cutoff enable rotation speed $N_{tc}$ in the step P13.

In this way, in the fuel supply recovery processing block RF, the duration of time for which the fuel supply cutoff is carried out and the magnitude of deceleration of the vehicle are learned in order to determine the characteristic change in the system so that the fuel supply cutoff enable rotation speed limit $N_{tc}$ is corrected in such a way that the fuel consumption always indicates an optimum amount under the condition that no fuel supply cutoff in a very short period of time occurs which affects adversely the engine driveability. Hence, the natural effect of fuel supply cutoff can be produced without sacrifice of the driveability.

Figure 3A:
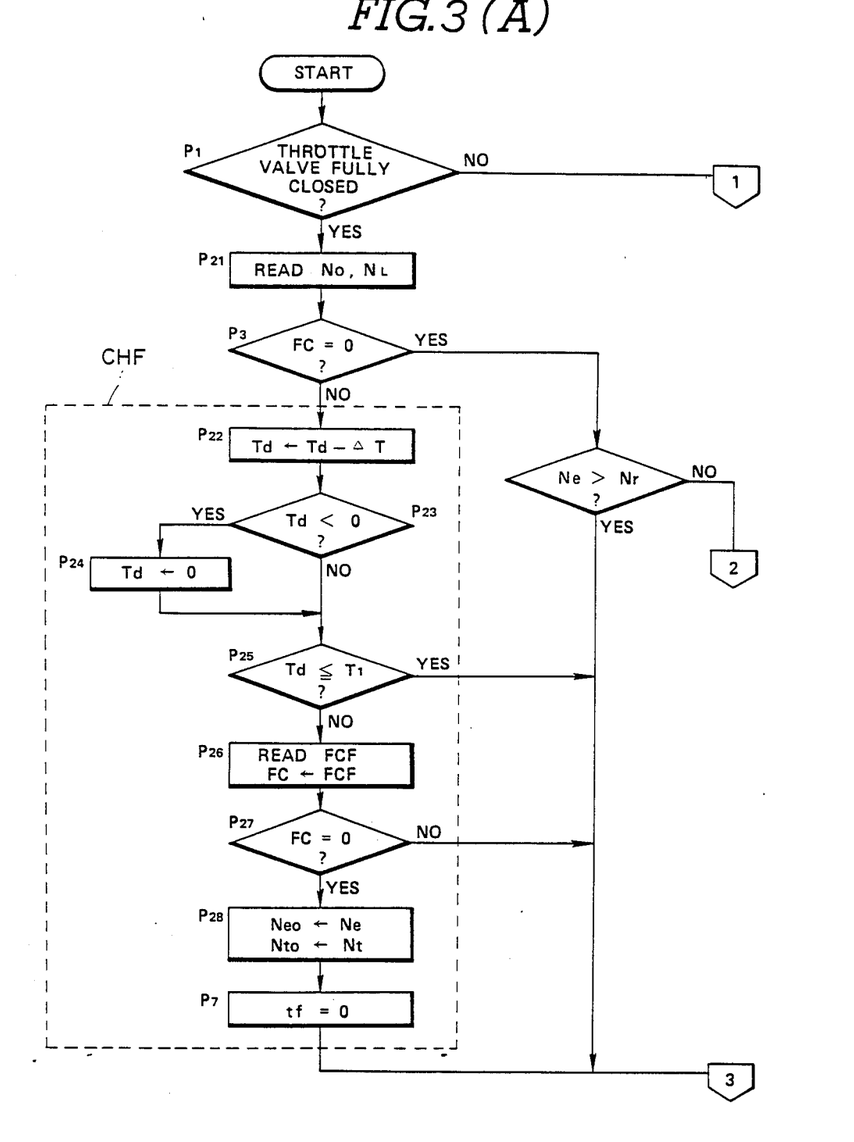
FIGS. 3(A) and 3(B) are integrally a processing flowchart for an execution of fuel supply cutoff control in a second preferred embodiment.
Figure 3B:
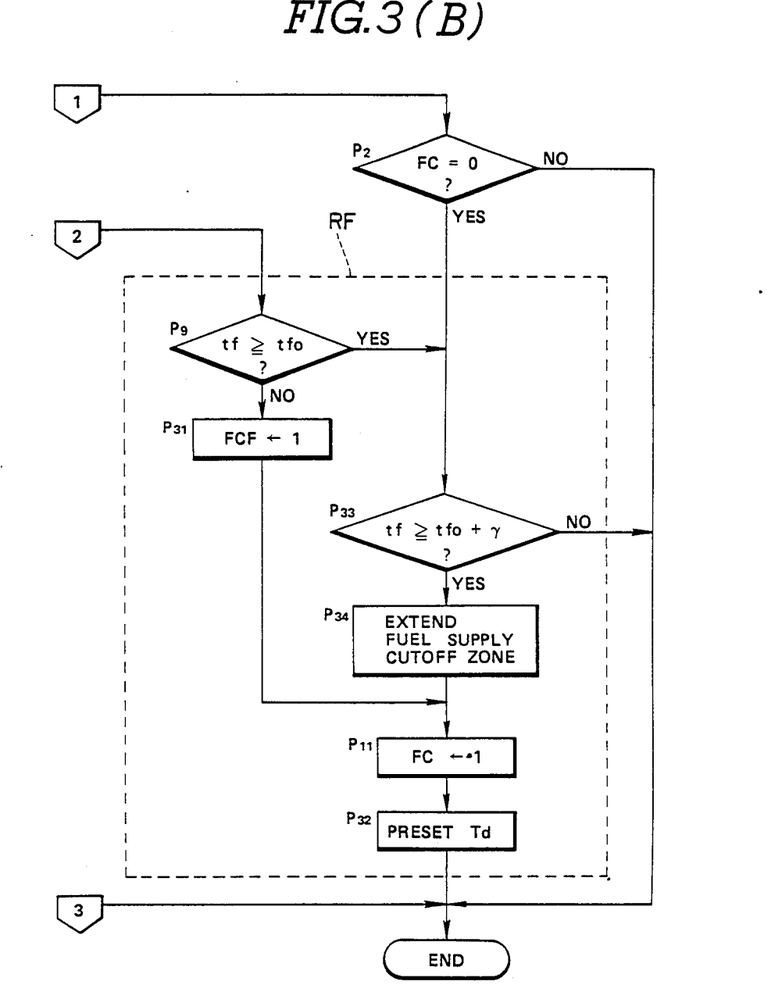

FIGS. 3(A) and 3(B) show integrally a second preferred embodiment. The hardware construction of the second preferred embodiment is exactly the same as in the first preferred embodiment shown in FIG. 1.

In the second preferred embodiment, since a pump rotation speed $N_p$ of a pump of the torque converter 6 is also detected by the inertia state detecting means 25, the contents of processing routine shown in FIGS. 3(A) and 3(B) are partially different from those shown in FIGS. 2(A) and 2(B).

It should be noted that since the pump rotation speed $N_p$ is actually almost the same as the engine speed $N_e$, the pump rotation speed $N_p$ is simultaneously detected by means of the crank angle sensor 24. In addition, the same contents of steps as those in the first preferred embodiment are designated by like reference numerals and their description is omitted here.

In FIGS. 3(A) and 3(B), when the throttle valve 22 is fully closed, the routine goes to a step P21 in which the control unit 30 reads the engine speed $N_e$ (also the pump rotation speed $N_o$) and turbine rotation speed $N_t$. Then the routine goes to the step P3. If FC=1, the routine goes to the fuel supply cutoff determination processing block CHF.

In a step P22, a predetermined value $\Delta T$ is subtracted from a value of a delay timer $T_d$. The value of $\Delta T$ is a time interval of an execution of the program shown in FIGS. 3(A) and 3(B).

In the next step P23, the control unit 30 determines whether the timer value $T_d$ is lower than zero [0]. If $T_d < 0$, the routine goes to a step P25 via a step P24 in which the value of $T_d$ is set to zero ($T_d = 0$). If $T_d \geq 0$, the routine goes directly to the step P25. In the step P25, the timer value $T_d$ is compared with a predetermined value $T_1$. If $T_d \geq T_1$ in the step P25 ($N_o$), the control unit 30 determines that a predetermined delay time has passed since the throttle valve 22 has completely been closed and goes to a step P26 in which a fuel supply cutoff factor FCF is read from a matrix shown in FIG. 4 on the basis of the values of the pump rotation speed $N_p$ and the turbine rotation speed $N_t$ as parameters. The read value of FCF is set as a status value of the fuel supply flag FC(FC< -FCF).

Figure 4:
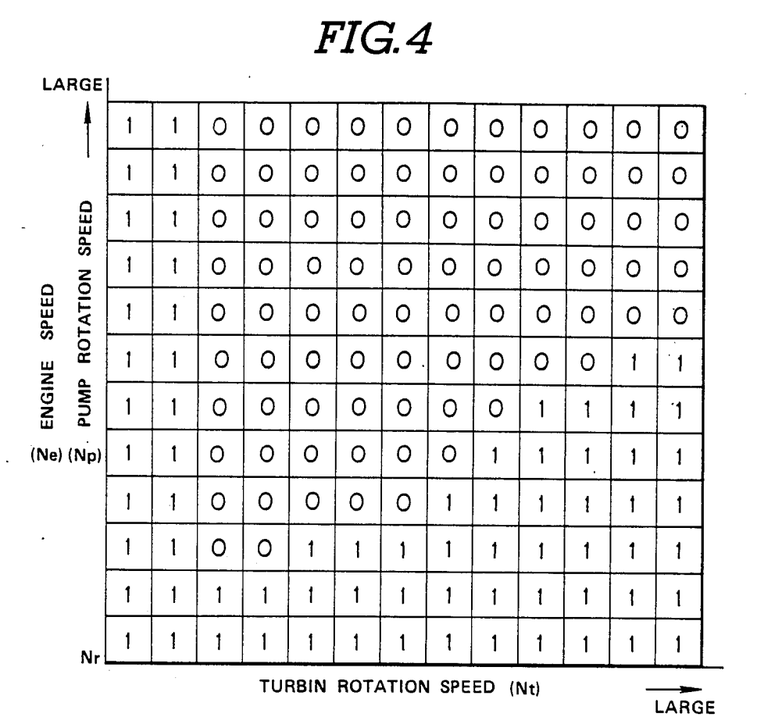
FIG. 4 is an explanatory view of a fuel cutoff zone relative to a turbine speed and engine speed used in the second preferred embodiment.

The fuel supply cutoff factor FCF indicates whether the fuel supply cutoff should be carried out according to the respective values of the rotation speeds $N_p$ and $N_t$. If FCF=1, the fuel supply cutoff is not carried out. If FCF=0, the fuel supply cutoff is carried out.

The matrix graph shown in FIG. 4 is preset so that the control unit 30 determines the traveling state of the vehicle (e.g., gear position of the transmission 5 and load of an auxiliary equipment of the engine 1) from the input/output rotation speed of the torque converter 6 and the appropriate initiation of the fuel supply cutoff is achieved. Hence, parts indicating that FCF=0 in FIG. 4 represent the fuel supply cutoff zone and parts indicating that FCF=1 represent the fuel supply zone.

Next, in a step P27, the control unit determines the status of flag FC. If FC=0, the routine goes to a step P28 in which the present engine revolution speed $N_t$ is set to $N_{eo}$ and present turbine rotation speed $N_t$ is set to $N_{to}$ and these values $N_{eo}$, $N_{to}$ are stored as fuel supply cutoff start engine and turbine rotation speeds into the memory. Then the routine goes to the step P7, in which the fuel supply cutoff timer is cleared and the routine ends.

On the other hand, when $T_d > T_1$ in the step P25 and when FC=1 in the step P27, the routine ends without execution of fuel supply cutoff.

In this way, for the predetermined period of time after the throttle valve has completely been closed, the supply cutoff is prolonged. During the prolonged period of time, the fuel supply cutoff factor FCF is appropriately determined on the basis of the values of the rotation speeds $N_p$ and $N_t$ varied according to the gear position of the automatic transmission 5. Hence, the fuel supply cutoff zone is defined particularly appropriately as is different from the determination merely on the basis of the engine speed Ne in the conventional fuel supply control system.

Next, the fuel supply recovery processing block RF in the second preferred embodiment will be described.

(I) A case when the routine is transferred to the fuel supply recovery processing block RF after the determination that $N_e \leq N_r$ in the step P4.

If $t_f < t_{fo}$ in the step P9, the routine goes to a step P31 in which the fuel supply cutoff factor FCF corresponding to the set of $N_{eo}$ and $N_{to}$ and upon which the present fuel supply cutoff is executed is set to "1" from "0" and goes to a step P11 in which the fuel supply recovery is executed. Thereafter, after the delay timer is preset to a predetermined initial value (the above-described delay time) in a step P32, the routine ends.

On the other hand, if $t_f \geq t_{fo}$ in the step P9, the timer value $t_f$ is compared with $[t_{fo} + \gamma]$ (symbol $\gamma$ denotes a positive predetermined value) in a step P33. If $t_f < t_{fo} + \gamma$ in the step P33, the routine ends. If $t_f \geq t_{fo} + \gamma$, the control unit 30 determines that the duration of time for which the fuel supply cutoff is carried out is longer than the scheduled time and extends the fuel supply cutoff zone in a step P34. Then the routine goes to the step P11. Specifically, in the step P34, the fuel supply cutoff zone is extended in the following manner. Each zone defined by the value of $N_{eo}$ and by the value of $N_{to}$ in the fuel supply cutoff factor FCF determined by the values of $N_{eo}$ and $N_{to}$ (the factor FCF is expressed in such a function form as FCF $\{N_{eo}, N_{to}\}$).

$$FCF\{N_{eo}, N_{to} + \alpha_t\} = 0$$

$$FCF\{N_{eo} - \alpha_e, N_{to}\} = 0$$

wherein $\alpha_t$ denotes a positive predetermined value and $\alpha_e$ denotes a positive predetermined value.

Consequently, the fuel supply cutoff zone is extended so that the fuel consumption is more highly improved.

(II) A case when the acceleration operation (specifically the driver depresses an accelerator pedal) is carried out.

The loop of P1-P2-P33 is formed and therefore an immediate fuel supply recovery is carried out.

In this way, since the inertia state of the vehicle is precisely determined in this embodiment, more precise control of the fuel supply cutoff and recovery can be achieved than that carried out in the first preferred embodiment.

Figure 5A:
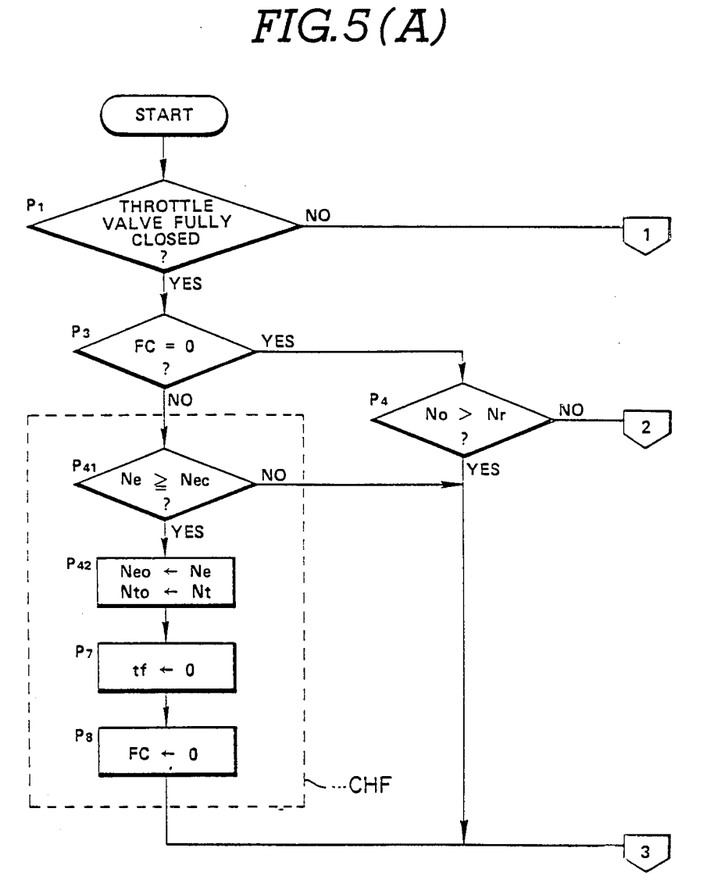
FIGS. 5(A) and 5(B) are integrally a processing flowchart for an execution of the fuel supply cutoff control in a third preferred embodiment.
Figure 5B:
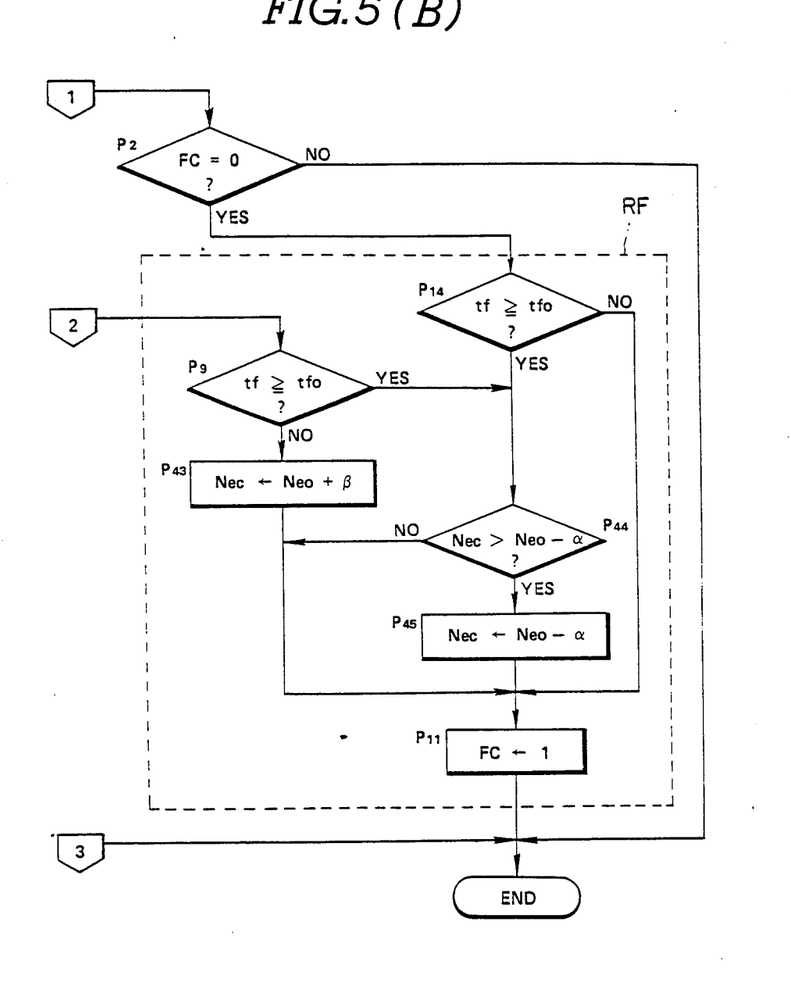

FIGS. 5(A) and 5(B) show integrally a third preferred embodiment. The hardware construction is the same as that shown in FIG. 1.

In the third embodiment, a fuel supply cutoff enable speed $N_{ec}$ of the engine 1 is set according to the engine driving condition in place of the fuel supply cutoff factor FCF in the matrix form described in the second preferred embodiment. The explanation of the same contents of steps designated by the like reference numerals as those shown in the first preferred embodiment is omitted here.

In the fuel supply cutoff determination block CHF shown in FIGS. 5(A) and 5(B), the current engine speed $N_e$ is compared with the fuel supply cutoff enable speed $N_{ec}$ of the engine 1 at a step P41.

Figure 6:
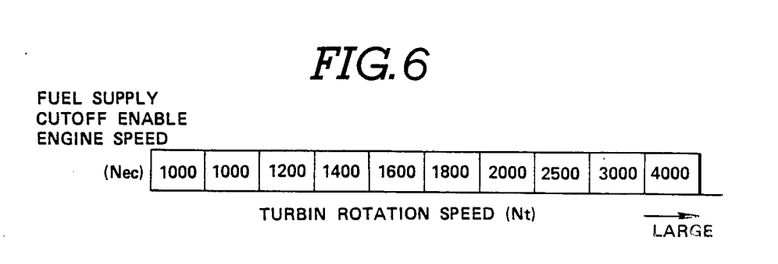
FIG. 6 is an explanatory view of set values of fuel supply cutoff enable engine speed limit $N_{ec}$ for each of drive regions of the turbine speed $N_t$.

The fuel supply cutoff enable speed $N_{ec}$ is a threshold value to determine whether the fuel supply cutoff is initiated when the engine 1 is in the deceleration state. As shown in FIG. 6, the value of $N_{ec}$ is set to an appropriate value for each change region of the turbine rotation speed $N_t$. When $N_e < N_{ec}$, the routine ends. When $N_e \geq N_{ec}$, the routine goes to a step P42 in which the current engine speed $N_e$ and turbine rotation speed $N_t$ are stored as the fuel supply cutoff start rotation engine speed $N_{eo}$ and fuel supply cutoff start turbine rotation speed $N_{to}$, respectively, and the routine goes to the step P7.

On the other hand, in the fuel supply recovery block RF, the fuel supply cutoff enable engine speed $N_{ec}$ is set higher than the engine speed value $N_{eo}$ by a positive predetermined value $\beta$ when $t_f < t_{fo}$ in the step P9. Then the routine goes to the step P11. The value of $N_{ec}$ is raised by the value of $\beta$ when the next fuel supply cutoff is started so that the duration of time for which the fuel supply cutoff is continued correspondingly becomes longer. When $t_f \geq t_{fo}$ in the step P9, the fuel supply cutoff enable rotation speed $N_{ec}$ is compared with the value of $N_{eo} - \alpha$ in a step P44. When $N_{ec} > N_{eo} - \alpha$ in the step P44, the routine goes to a step P45 in which the value of $N_{ec}$ is replaced with the value of $(N_{eo} - \alpha)$ to correct the value of $N_{ec}$ so as to reduce the value of the fuel supply cutoff enable engine speed $N_{ec}$.

If $N_{ec} \leq N_{eo} - \alpha$, the routine goes directly to the step P11.

It should be noted that since the above-described case satisfies the fuel supply cutoff conditions such a relationship as $N_{eo} \geq N_{ec}$ is established. The reason for carrying out the correction of the value $N_e$ is that the duration of time for which the fuel supply cutoff exceeds the predetermined value $t_{fo}$ even though the engine speed $N_{eo}$ at the time when the fuel supply cutoff is started is considerably near to the conventional fuel supply cutoff enable speed $N_{ec}$ (the difference is within $\alpha$). A method, such as determining whether the reducing correction is carried out on the basis of the duration of time for which the fuel supply is cutoff, is carried out as in the second preferred embodiment.

In this way, the fuel supply cutoff enable speed $N_{ec}$ of the engine 1 is appropriately set according to the turbine rotation speed $N_t$ and the value of $N_{ec}$ is corrected by means of the learning control. Consequently, the effect of saving fuel consumption can be improved.

Figure 7:
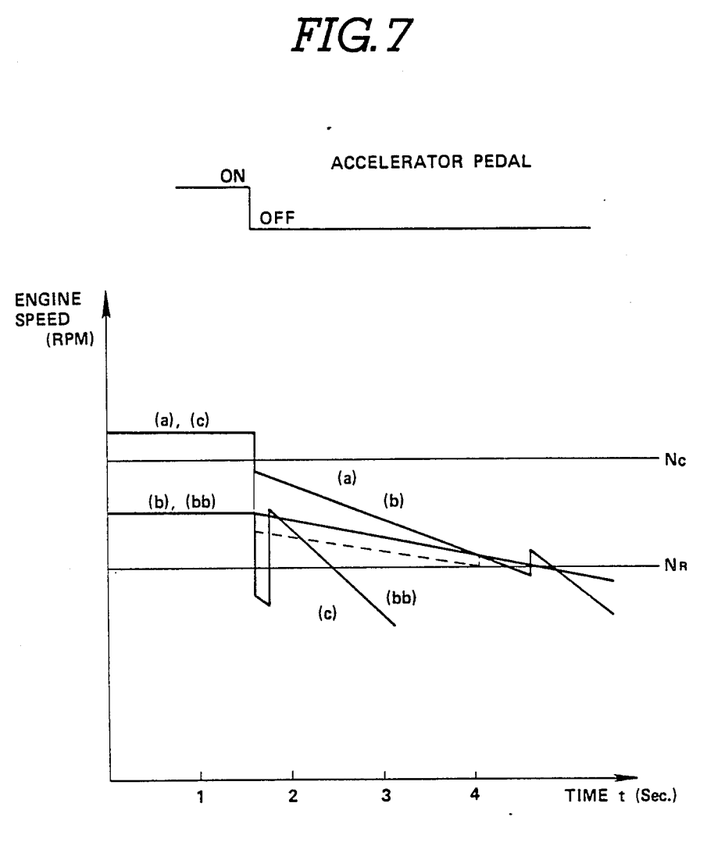
FIG. 7 is an example of characteristic graph indicating change patterns of the engine speed during the engine deceleration.

FIG. 7 shows the relationship between the engine speed $N_e$ and duration of time for which the fuel supply cutoff is continued. In FIG. 7, a line (a) denotes a normal change characteristic when the vehicle is decelerated, a line (b) denotes that when the vehicle goes down along a long hill, a line (c) denotes that when the vehicle goes down along the long hill. In the case of (a), the fuel supply cutoff is carried out until the engine speed reaches the fuel supply recovery start value $N_R$. In the case of (b), the fuel supply cutoff is not carried out. In the case of (c), the fuel supply is cut off and immediately resumed. In the case of (bb), the fuel supply cutoff is enabled but the resumption of fuel supply is not immediately carried out, i.e., the fuel supply cutoff duration is extended.

According to the present invention as described above, the system and method for controlling fuel supply to the vehicular engine can carry out the appropriate control of the fuel supply cutoff and resumption, while determining the characteristic change of each part of the system including the engine and power transmission mechanism using the learning control method. Consequently, the natural effect of cutting off the fuel supply can be enhanced without sacrifice of the engine driveability.

It will clearly be appreciated by those skilled in the art that the foregoing description is made in terms of preferred embodiments and various changes and modification may be made without departing from the scope of the present invention which is to be defined by the appended claims.

What is claimed is:

1. A system for a vehicular internal combustion engine, comprising:
    (a) first means for detecting whether the engine has entered a predetermined deceleration state;
    (b) second means for measuring a magnitude of the engine deceleration when the engine has entered the predetermined deceleration state;
    (c) third means for varying a first predetermined threshold value defining a cutoff zone of fuel supplied to the engine and at which the cutoff of fuel supply to the engine is initiated so as to provide an optimum range of the cutoff zone according to the measured magnitude of engine deceleration; and
    (d) fourth means for learning the variation of the first predetermined threshold value and storing the first predetermined threshold value varied in said third means, the learned and stored first predetermined threshold value thereby being used as the first predetermined threshold value in said third means.

2. The system according to claim 1, wherein said third means varies the first predetermined threshold value such that as the magnitude of engine deceleration increases, the first predetermined threshold value increases.

3. The system according to claim 1, which further comprises:
    (e) fifth means for detecting an engine revolution speed when the engine has entered the predetermined deceleration state; and
    (f) sixth means for determining whether the detected engine revolution speed is below a second predetermined threshold value defining the cutoff zone of fuel supply to the engine and at which a fuel supply resumption after the fuel supply cutoff is initiated.

4. The system according to claim 3, which further comprises:
    (g) seventh means for detecting a rotation speed of a turbine runner of an engine power transmission mechanism linked with the engine via an operating fluid; and
    (h) eighth means for determining whether the rotation speed of the turbine runner is above the first predetermined threshold value when the engine has entered the predetermined deceleration state.

5. The system according to claim 4, wherein said second means measures a time duration from a time when the rotation speed of the turbine runner is determined to be above the first predetermined threshold value to a time when the engine revolution speed is below the second predetermined threshold value.

6. The system according to claim 5, which further comprises ninth means for determining whether the time duration measured by said second means exceeds a predetermined time value and tenth means for increasing the stored first predetermined threshold value by a first positive predetermined value when the time duration does not exceed the predetermined time value and wherein said eighth means, in turn, determines whether the rotation speed of the turbine is above the increased first predetermined threshold value by said tenth means and stored in said fourth means.

7. The system according to claim 6, which further comprises eleventh means for setting the first predetermined threshold value to the rotation speed of the turbine to which a second positive predetermined value is added when the time duration exceeds the predetermined threshold value and the first predetermined threshold value is above the rotation speed of the turbine to which the second positive predetermined value.

8. The system according to claim 3, which further comprises:
(g) seventh means for determining whether a predetermined delay time has elapsed after the engine has entered the predetermined deceleration state;
(h) eighth means for detecting a rotation speed of a turbine runner of an engine power transmission mechanism linked with the engine via an operating fluid;
(i) ninth means for determining whether the engine is within the fuel supply cutoff zone on the basis of the detected engine revolution speed and rotation speed of the turbine when the predetermined delay time has elapsed; and
(j) tenth means for executing the fuel supply cutoff when said ninth means determines that the engine is within the fuel supply cutoff zone.

9. The system according to claim 8, wherein said fourth means stores the detected engine revolution speed and rotation speed of the turbine, both of which defining the first predetermined threshold value, when the engine is within the fuel supply cutoff zone and the predetermined delay time has elapsed.

10. The system according to claim 3, which further comprises:
(g) seventh means for executing the resumption of fuel supply after the fuel supply cutoff when the engine revolution speed is below the second predetermined threshold value;
(h) eighth means for determining whether a time duration for which the fuel supply cutoff is executed exceeds a predetermined time value to which a first positive predetermined value is added; and
(i) ninth means for extending the fuel supply cutoff zone when said eighth means determines that the time duration exceeds the predetermined time value to which the positive predetermined value is added.

11. The system according to claim 10, wherein said ninth means extends the fuel supply cutoff zone in such a way that a factor determining whether the engine is to be within the fuel supply cutoff zone or not on the basis of the rotation speed of the turbine and revolution speed of the engine when the predetermined delay time has elapsed, both of which are stored in said fourth means, is set forcibly so as to determine that the engine is to be within the fuel supply cutoff zone, with a second positive predetermined value added to the stored rotation speed of the turbine and a third positive predetermined value subtracted from the stored revolution speed of the engine.

12. The system according to claim 3, which further comprises:
(g) seventh means for determining whether the detected engine revolution speed is above the first predetermined threshold value which is determined by a rotation speed of a turbine runner of an engine power transmission linked with the engine; and
(h) eight means for detecting the rotation speed of the turbine runner when the engine has entered the predetermined deceleration state and wherein said fourth means stores the engine revolution speed above the first predetermined threshold value and the corresponding detected rotation speed of the turbine.

13. The system according to claim 12, wherein said second means comprises: (i) ninth means for determining whether a time duration for which the engine is within the fuel supply cutoff zone exceed a predetermined time value and the system further comprises (j) tenth means for setting the first predetermined threshold value of the engine revolution speed to the stored engine revolution speed in said fourth means to which a first positive value is added when the time duration does not exceed the predetermined time value.

14. The system according to claim 13, wherein said tenth means sets the first predetermined threshold value of the engine revolution speed to the stored engine revolution speed in said fourth means from which a second positive predetermined value is subtracted when the time duration exceeds the predetermined time value and the first predetermined threshold value is above the stored engine revolution speed in said fourth means from which the second positive predetermined value is subtracted.

15. A system for controlling a fuel supply to a vehicular internal combustion engine, comprising:
(a) first means for transmitting an output power of the engine to a vehicle body via a predetermined operating fluid and transmitting a travel inertia force from the vehicle body to the engine when the engine is in a fuel supply cutoff state;
(b) second means for detecting an inertia movement state of the engine on the basis of a rotation speed of at least output side of said first means;
(c) third means for detecting an engine driving condition;
(d) fourth means for learning and storing an optimum range of a fuel supply cutoff zone of the engine on the basis of at least one of the detected engine driving condition and the detected engine inertia movement state;
(e) fifth means for reading the fuel cutoff zone from said fourth means when the engine has transferred to a predetermined deceleration state and outputting a fuel supply cutoff command;
(f) sixth means for calculating an amount of fuel supply on the basis of the detected engine operating condition, outputting a fuel supply command whose duration accords with the calculated fuel supply amount, and inhibiting the output of the fuel supply command when receiving the fuel supply cutoff command from said fifth means; and (g) seventh means for supplying the fuel to the engine on the basis of the fuel supply command.

16. A method for a vehicular internal combustion engine, comprising the steps of:
   (a) detecting whether the engine has entered a predetermined deceleration state;
   (b) measuring a magnitude of the engine deceleration when detecting that the engine has entered the predetermined deceleration state in said step (a);
   (c) varying a first predetermined threshold value defining a cutoff zone of fuel supplied to the engine and at which the cutoff of fuel supply to the engine is initiated so as to provide an optimum range of the cutoff zone according to the measured magnitude of engine deceleration in said step (b); and
   (d) learning the variation of the first predetermined threshold value and storing the first predetermined threshold value varied in said step (c), the learned and stored first predetermined threshold value being used as the first predetermined threshold value in said step (c).

17. The method according to claim 16, wherein the first predetermined threshold value is varied dependent on whether a duration of time for which the engine is within the fuel cutoff zone exceeds a predetermined time value.

18. The method according to claim 16, wherein the first predetermined threshold value corresponds to at least one of an engine revolution speed and a rotation speed of a turbine runner of an engine power transmission.

19. The method according to claim 16, wherein the first predetermined threshold value corresponds to an engine revolution speed when a predetermined time has elapsed after the engine has entered the predetermined deceleration state.

* * * * *